United States Patent [19]
Faul

[11] Patent Number: 5,271,704
[45] Date of Patent: Dec. 21, 1993

[54] BROACHING DEVICE FOR A SILO

[75] Inventor: Josef Faul, Aalen-Wasseralfingen, Fed. Rep. of Germany

[73] Assignee: Schwäbische Hüttenwerke GmbH, Aalen-Wasseralfingen, Fed. Rep. of Germany

[21] Appl. No.: 894,076

[22] Filed: Jun. 4, 1992

[30] Foreign Application Priority Data

Aug. 22, 1991 [EP] European Pat. Off. ........ 91114050.7

[51] Int. Cl.⁵ .............................................. B65G 65/48
[52] U.S. Cl. .................................... 414/324; 222/228; 267/158
[58] Field of Search ............... 414/304, 305, 313, 314, 414/324, 326; 267/158, 53; 222/228, 241

[56] References Cited

U.S. PATENT DOCUMENTS

| | | | |
|---|---|---|---|
| 416,053 | 11/1889 | Cleek | 267/53 |
| 1,114,312 | 10/1914 | Tomasini | 267/53 |
| 1,199,111 | 9/1916 | Randolph | 267/53 X |
| 1,613,097 | 1/1927 | Hamilton | 267/53 |
| 1,799,880 | 4/1931 | Arcard et al. | 267/53 X |
| 3,379,323 | 4/1968 | Knutsen | 414/324 |
| 3,455,470 | 7/1969 | Kanagy et al. | 414/324 |
| 3,703,967 | 11/1972 | Gessler | 414/324 |
| 3,710,959 | 1/1973 | Gessler | 414/324 |
| 3,737,054 | 6/1973 | Gessler | 414/324 |
| 3,833,134 | 9/1974 | Gessler | 414/324 |
| 3,985,244 | 10/1976 | Gessler et al. | 414/304 |

FOREIGN PATENT DOCUMENTS

| | | | |
|---|---|---|---|
| 715252 | 11/1941 | Fed. Rep. of Germany | 414/304 |
| 1801504 | 5/1970 | Fed. Rep. of Germany | 414/304 |
| 2063140 | 5/1981 | Fed. Rep. of Germany | |

*Primary Examiner*—David A. Bucci
*Attorney, Agent, or Firm*—Robert W. Becker & Associates

[57] ABSTRACT

A broaching device for a silo is comprised of a rotor and at least one broaching arm connected to the rotor. The broaching arm comprises leaf springs that are stacked on top one another to form a leaf spring packet. The broaching arm further comprises brackets for holding the leaf springs together. The broaching arm extends to the wall of the silo and is curved opposite to a direction of rotation of the rotor. A holder is connected to one of the leaf springs arranged in a center position of the leaf spring packet at a free end thereof. Outwardly positioned leaf springs of the leaf spring packet are slidably supported at the holder. A broaching tool is attached to the holder of the broaching arm.

17 Claims, 3 Drawing Sheets

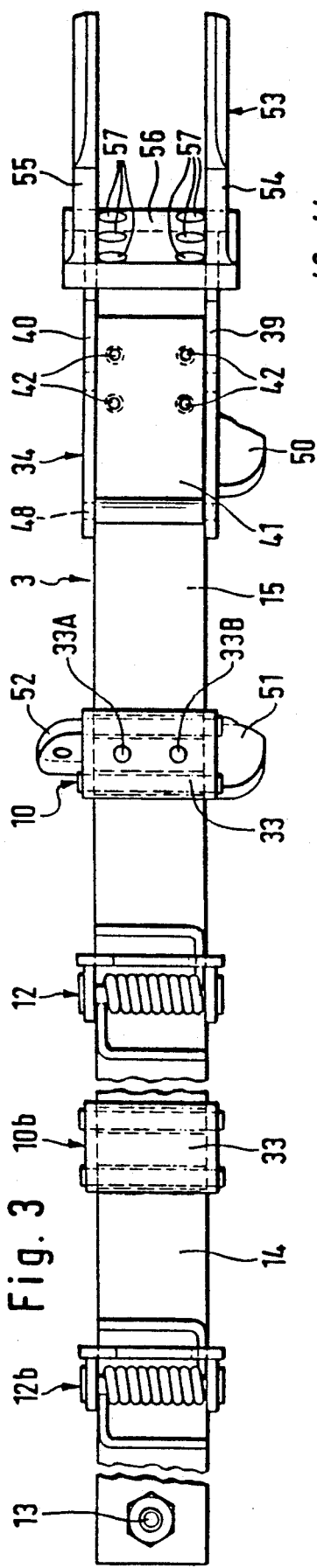
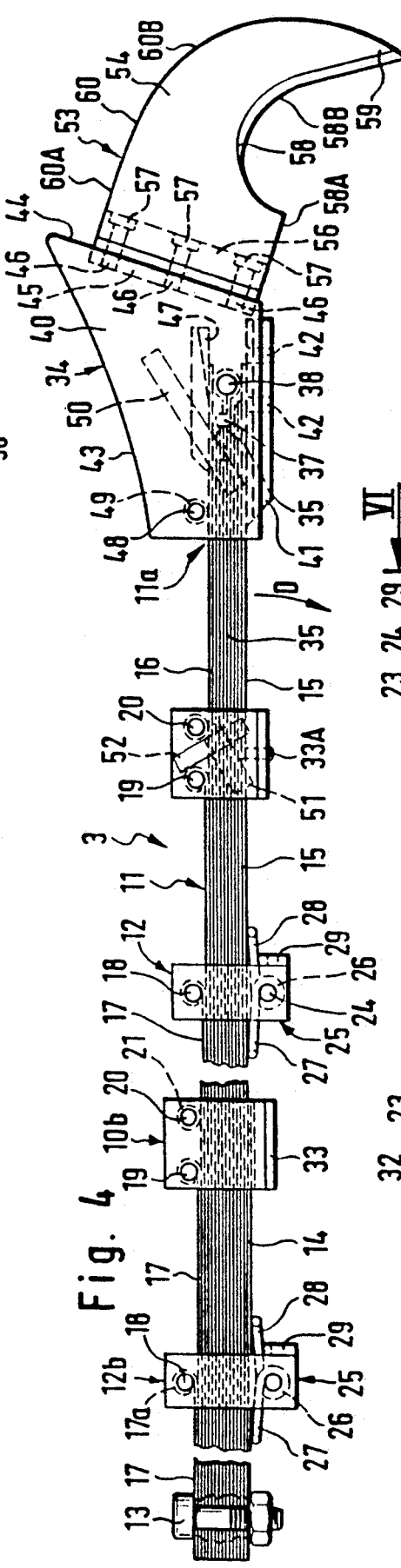
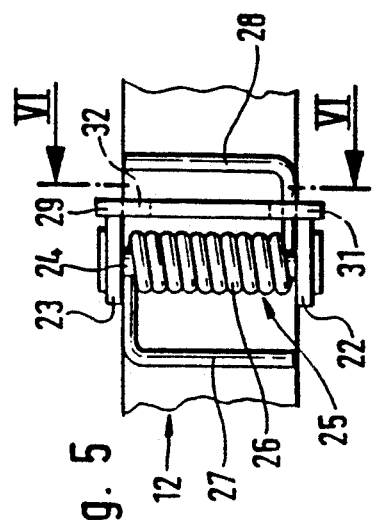
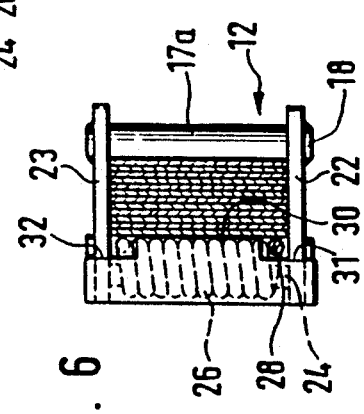

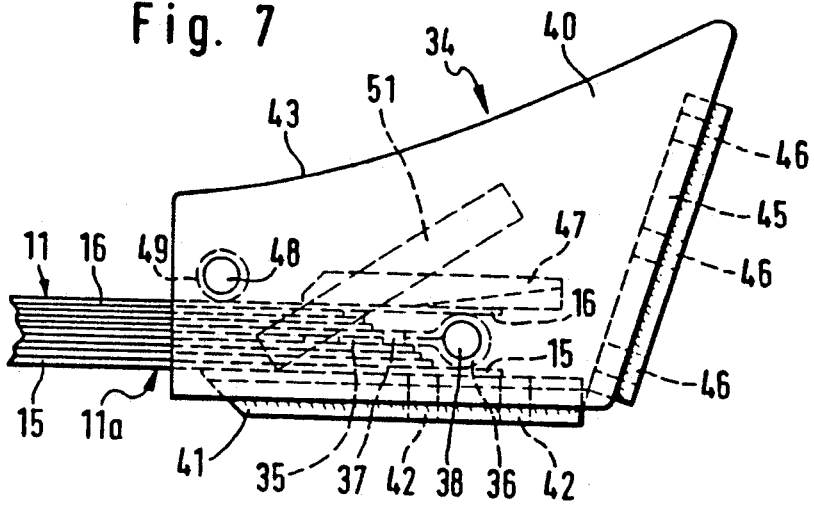
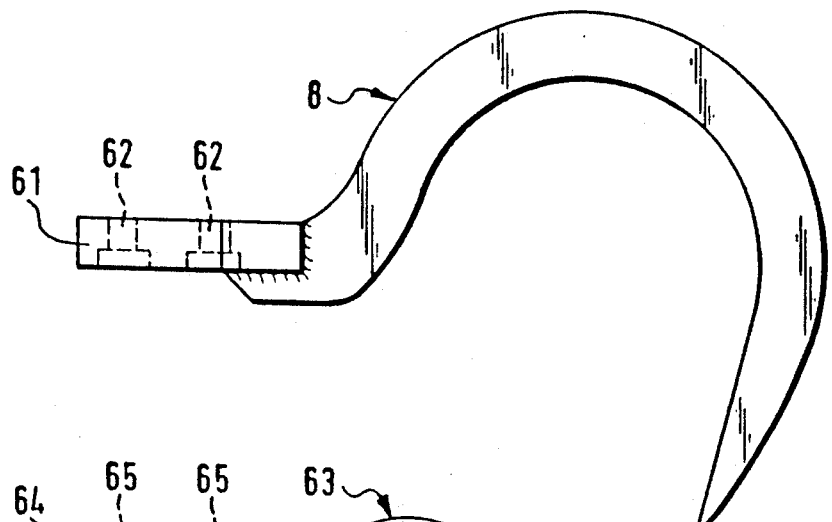
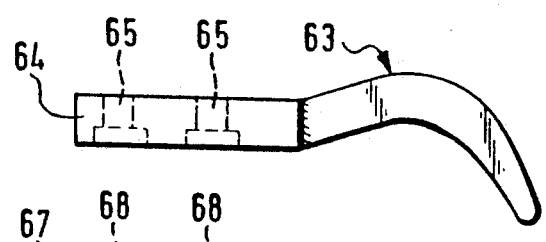
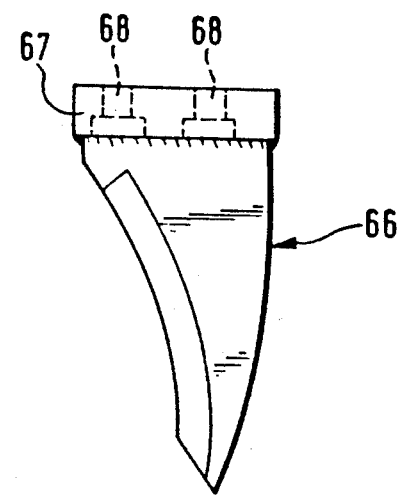

BROACHING DEVICE FOR A SILO

BACKGROUND OF THE INVENTION

The present invention relates to a broaching device for a silo comprising a rotor and at least one broaching arm connected to the rotor. The broaching arm is comprised of leaf springs stacked on top one another to form a leaf spring packet and further of brackets for holding the leaf springs together. The broaching arm extends to the wall of the silo and is curved opposite to a direction of rotation of the rotor. A holder is connected to the end of the broaching arm, and broaching tools are connected to this holder.

Such a device is known from German Patent 20 63 140. This device serves to loosen stored material in a silo, especially in the vicinity of the bottom portion of the silo, and to move the stored material toward transporting devices, such as a screw conveyor, for transporting the stored material outwardly. The transporting devices are arranged below openings provided within the bottom portion of the silo. The spring-elastic broaching arms may bend backwardly against the direction of rotation of the rotor under the load of the stored material whereby they may come to rest at the circumference of the rotor. Accordingly, the torque required for driving the rotor remains within feasible limits. From this extremely backwardly bent position, the broaching arms which are under a radial stress have the tendency to move outwardly so that with each revolution of the rotor their broaching tools connected to the free ends will dig deeper into the column of stored material in the direction toward the wall of the silo. Thus, a vault is formed within the stored material which has a constantly increasing diameter and which will collapse when the annular section of the stored material within the silo which supports the vault has been removed. The free ends of the broaching arms are thus positioned closely to the wall of the silo. The broaching arms are maintained in this position in which they are bent counter to the direction of rotation of the rotor, for example, by providing a cable between the free ends of the broaching arms and the rotor. This has the advantage that a great portion of the load which acts on the free ends of the broaching arms and the holders connected thereto may be compensated by the broaching arm as a pulling force component. Furthermore, with this arrangement a constant transport of the stored material within the silo into the commonly radially extending Openings of the bottom portion of the silo is achieved.

Since the broaching arm over its entire length is embodied as a leaf spring packet with leaf springs stacked on top one another held together by brackets, a displacement of the leaf springs relative to one another takes place due to the changing curvature. All of the leaf springs except the outermost leaf spring connected to the holder for the broaching tool are freely slidable within the holder. This outer leaf spring the bending deformation of which has the greatest value must also compensate the pulling force component of the load acting onto the broaching tool and is furthermore subjected to wear due to the movement of the stored material. Other parts of the broaching arms may also be subjected to extremely great wear, especially within the area of the brackets which are holding the leaf spring packet together. These brackets may be clamped in a known manner relative to the leaf spring packet by leg springs whereby the spring coils of the leg springs are arranged transverse to the longitudinal extension of the leaf spring packet and their legs are resting at the outer leaf springs.

It is therefore an object of the present invention to improve the broaching device of the aforementioned kind such that its operational safety is improved, and especially the service life of the broaching arms is increased.

SUMMARY OF THE INVENTION

The broaching device for a silo according to the present invention is primarily characterized by a rotor, at least one broaching arm connected to the rotor, the broaching arm being comprised of leaf springs stacked on top one another to form a leaf spring packet, and further comprising brackets for holding the leaf springs together, the broaching arm extending to a wall of the silo and being curved opposite to a direction of rotation of the rotor; a holder connected to one of the leaf springs arranged in a center position of the leaf spring packet at a free end of the leaf spring packet, with outwardly positioned ones of the leaf springs of the leaf spring packet being slidably supported at the holder; and a broaching tool attached to the holder.

Due to the attachment of the holder to a centrally located leaf spring of the leaf spring packet, the pull and torsion loads are received and compensated by the leaf spring which is located at the center of the broaching arm and which is essentially protected against soiling and wear. Furthermore due to its position in the neutral zone of the broaching arm, the centrally located leaf spring is subjected to reduced bending loads as compared to the outer leaf springs of the prior art embodiment. Since the centrally located leaf spring is supported with both sides at the remaining leaf springs the torsion load is also reduced. Due to the slidable support of the two outwardly oriented leaf springs at the holder, the leaf spring packet is held together at this location and a spreading of the leaf spring ends is prevented.

Preferably, the leaf spring arranged in the center position is connected to the holder at a center portion of the holder, whereby the center portion is determined relative to a longitudinal extension of the holder in a longitudinal direction of the leaf spring packet. The holder has preferably a U-shape and comprises a cross-piece and two side plates connected to one another by the cross-piece to form that U-shape. Furthermore, a connecting bar for connecting the free ends of the side plates to one another is provided, whereby a first one of the outwardly positioned leaf springs that is forwardly oriented with respect to the direction of rotation is slidably supported at the cross-piece and the second one of the outwardly oriented leaf springs that is rearwardly oriented with respect to the direction of rotation is slidably supported at the connecting bar.

In one preferred embodiment, at least some of the brackets are clamping brackets, each one of the clamping brackets comprising a leg spring having a spring coil and legs. The clamping brackets are supported with the leg springs at a first one of the outwardly positioned leaf springs that is forwardly oriented with respect to the direction of rotation such that the spring coils extend transverse to a longitudinal direction of the leaf spring packet and the legs rest at the first outwardly positioned leaf spring. The clamping bracket further comprises an abutment for limiting a movement of the spring coil toward the leaf spring packet. With this inventive embodiment, the wear at the broaching arm is reduced, because, when the bending of the broaching arm increases, the movement of the spring coil toward the leaf spring packet is limited by the abutment that is connected to the bracket. Thus, a contact of the spring coil with the neighboring outer leaf spring is prevented so that no wear due to friction occurs at the legs of the leg spring. Furthermore, the legs will not be over extended.

Preferably the abutment is a plate with at least one cutout, with one of the legs of the leg spring resting in the output with play. The plate has a face facing the leaf spring packet, that face being closer to the first outwardly positioned leaf spring than the spring coil.

In another advantageous embodiment of the present invention, a first one of the outwardly positioned leaf springs that is forwardly oriented with respect to the direction of rotation further comprises an outwardly oriented cover leaf spring in the area of the free end of the leaf spring packet. This arrangement further improves the wear resistance of the broaching arm because the cover leaf spring which is arranged outwardly in the direction of rotation protects the leaf spring arranged underneath against wear due to friction and, for this purpose, may be comprised of an especially selected material with respect to wear resistance since the cover leaf spring must not have the same spring characteristics as the remaining leaf springs. The tension force of the broaching arm may be increased by adding further leaf springs. Preferably, the cover leaf spring extends approximately over 50% of the length of the leaf spring packet.

The broaching tool is embodied in various shapes and is exchangeably attached to the holder. Various embodiments of broaching tools are important in order to provide the suitable broaching tool for different stored materials.

Preferably, the holder comprises a fastening plate connected to the free end of the leaf spring packet for attaching thereto the broaching tool, the fastening plate being arranged at an angle relative to a longitudinal direction of the free end of the leaf spring packet. Preferably, the angle is an obtuse angle, with the fastening plate extending rearwardly relative to the direction of rotation. It is advantageous that the broaching tool extend essentially perpendicular to a plane that extends at an obtuse angle and counter to the direction of rotation relative to a plane of the leaf spring arranged in the center position, the broaching tool having a hooked-shaped end that is pointing in a forward direction relative to the direction of rotation. With this embodiment, the broaching tool lies essentially in the pulling axis of the broaching arm. Accordingly, the broaching tool transmits essentially only pulling forces to the leaf spring packet so that torsion fractures of the leaf springs may be prevented. This preferred embodiment increases the service life of the broaching arm and the holder.

In a special embodiment of the broaching tool, the tool comprises two parallel, congruent flat portions that are hook-shaped.

It is expedient that the holder comprises a cross-piece connected to a longitudinal side of the leaf spring packet for attaching thereto the broaching tool, the cross-piece being parallel to a wide side of the free end of the leaf spring packet. The broaching tool connected to the cross-piece is selected from the group consisting of a hook that is essentially curved as a circular arc over most of its length, a short, sickle-shaped hook, and a horn-shaped scraper that is essentially perpendicularly arranged relative to the cross-piece.

It is furthermore advantageous that the broaching device comprise a glide plate that is connected to the holder for supporting the broaching arm at the floor of the silo. The glide plate may also be connected to one of the brackets which are adjacent to the holder. It is furthermore possible that glide plates be connected to the holder as well as to the bracket which is adjacent to the holder. The glide plates improve the guiding of the leaf spring packet and increase the service life of the device.

BRIEF DESCRIPTION OF THE DRAWINGS

This object, and other objects and advantages of the present invention, will appear more clearly from the following specification in conjunction with the accompanying drawings, in which:

FIG. 3 shows a broaching arm in a side view viewed counter to the direction of rotation whereby the broaching arm is represented in a stretched position;

FIG. 4 shows a plan view of the broaching arm according to FIG. 3;

FIG. 5 shows an enlarged representation of the clamping bracket for the leaf spring packet in a view corresponding to FIG. 3;

FIG. 6 shows a sectional view along the line VI—VI in FIG. 5;

FIG. 7 shows an enlarged representation of the free end of the broaching arm with holder in a plan view according to FIG. 4;

FIG. 8 shows a broaching tool in the form of a hook that is essentially curved as a circular arc;

FIG. 9 is a broaching tool in the form of a sickle-shaped hook; and

FIG. 10 is a broaching tool in the form of a scraper.

DESCRIPTION OF PREFERRED EMBODIMENTS

The present invention will now be described in detail with the aid of several specific embodiments utilizing FIGS. 1 through 10.

Figure 1:
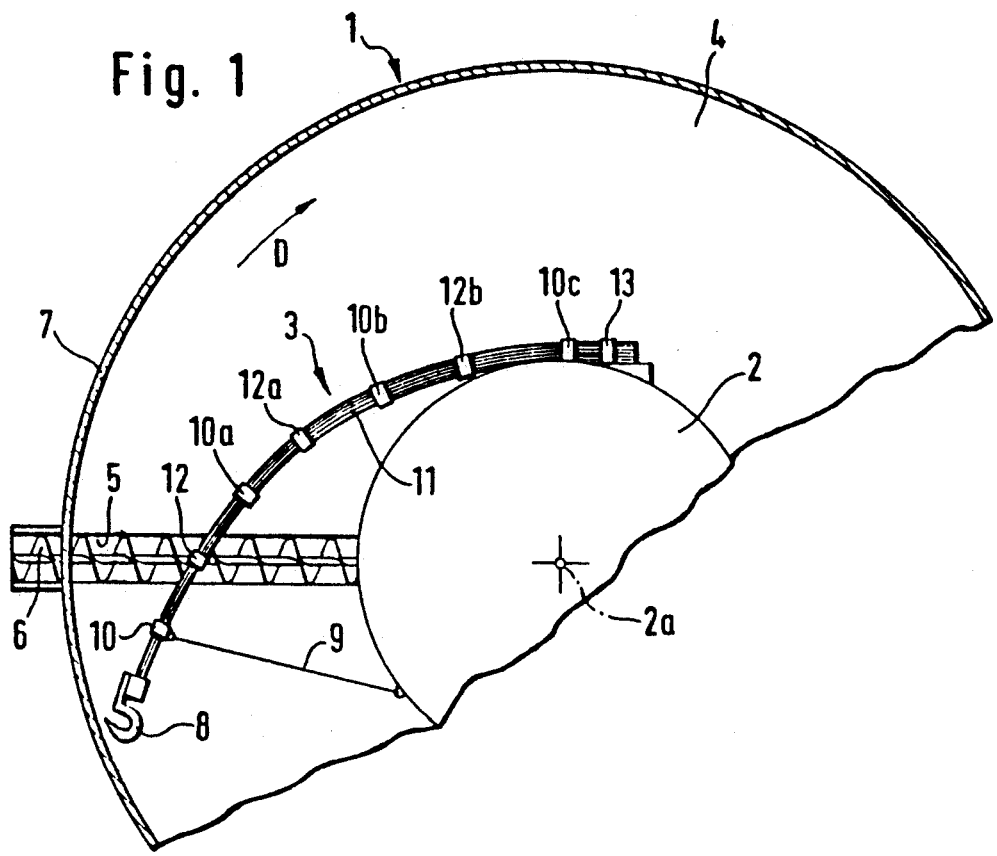
FIG. 1 is a schematic representative of a rotor with a broaching arm in a partial plan view of the bottom portion of the silo.
Figure 2:
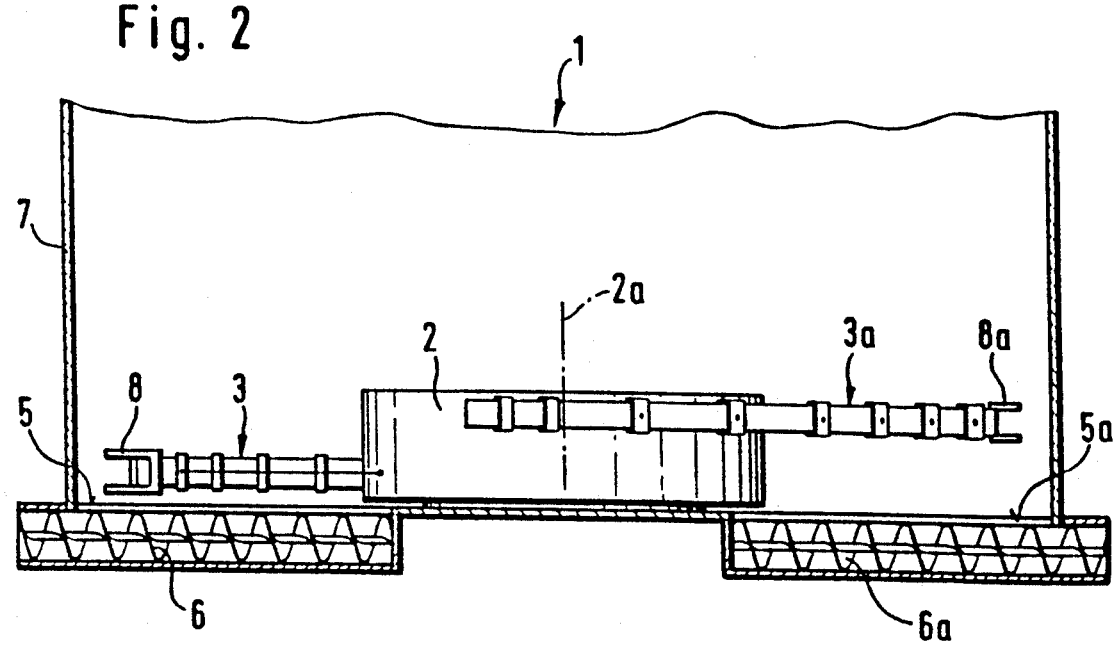
FIG. 2 is a partial side view of a silo with rotor and broaching arms, corresponding to FIG. 1.

FIGS. 1 and 2 shows schematically a partial plan view, respectively; a partial side view of a silo 1 with a rotor 2, with two broaching arms 3 and 3a connected to the rotor 2. When the rotor 2 is driven, the broaching arms 3 and 3a rotate in the direction of the arrow D. They move closely above the surface of the bottom portion 4 of the silo 1. The broaching arm 3a is arranged somewhat higher than the broaching arm 3, as can be seen in FIG. 2, however, it may be located at the same elevation as the broaching arm 3. The bottom portion 4 of the silo 1 is provided with two radial openings 5 and 5a below which a respective screw conveyor with a worm gear 6, respectively, 6a is located which remove the material that has been introduced into the trough of the screw conveyor from the silo. As can be seen in FIG. 1, the broaching arm 3 is connected to the rotor 2 in an approximately tangential position and from there it is curved counter to the direction of rotation D. In the drawing, the maximum extension of the broaching arm 3 in the direction toward the wall 7 of the silo is represented, whereby a broaching tool 8 connected to the free end of the broaching arm is closely positioned closely to the wall 7 of the silo. The broaching arm is maintained in this backwardly curved position by a cable 9 which, for this purpose, is tensioned between the rotor 2 and a bracket 10 positioned at the end of the broaching arm. The broaching arm 3 is comprised essentially of a leaf spring packet 11 the leaf springs of which are held together by the bracket 10 and a plurality of further identical brackets 10a, 10b and 10c as well as by clamping brackets 12, 12a and 12b.

When the rotor 2 is driven about its axis of rotation 2a and the weight of the material stored in the silo loads the bottom portion 4 of the silo 1 over the entire bottom surface area, the broaching arms 3 and 3a are initially bent backwardly against the resistance of the stored material, whereby the broaching arms, in this position, rest with a portion of their length or with their entire length at the cylindrical wall of the rotor 2. Thus, for driving in rotation the broaching arms, the required torque is relatively small. The broaching tool 8 and also the broaching tool 8a of the broaching arm 3a loosen the stored material in the vicinity of the rotor 2 whereby the spring-elastic broaching arm 3 will be moved in the outward direction towards the silo wall. The broaching arms, during their rotation, pass the radial openings 5 and 5a of the bottom portion 4 of the silo and accordingly convey accordingly the stored material through the openings into the screw conveyors 6 and 6a. The backwardly bent position of the broaching arms results in a constant conveying of the stored material into the screw conveyors. The broaching arms furthermore prevent a bridging of the stored material above the bottom portion of the silo by which the refilling flow of the stored material could be blocked. Such bridges or vaults are collapsed as soon as the broaching tools 8 and 8a approach the vicinity of the silo wall 7 and thereby remove and prevent an annular condensation of the stored material upon which such a bridge or vault could be supported.

The constructive design of the broaching arms is demonstrated with the aid of the embodiment of the broaching arm 3 in FIGS. 3 to 7.

The leaf spring packet 11 is comprised of 15 leaf springs which are fixedly clamped together at their inwardly oriented end that is connected to the rotor by a screw 13 penetrating the leaf spring packet and a nut positioned on the screw 13. On the forward side of the broaching arm (viewed in the direction of rotation D) an outer leaf spring 14 is positioned which extends over the entire length of the leaf spring packet 11 and which is further comprised of a cover leaf spring 15 arranged in the vicinity of the free end 11a of the leaf spring packet 11. The cover leaf spring 15 extends over 50% of the length of the leaf spring packet. In order to provide optimum spring characteristics to the broaching arm 3 for its desired function, the leaf spring packet 11 has a stepwise reduced thickness when viewed in the direction toward the free end 11a. For this purpose, the leaf springs on the opposite side of the leaf spring 14 have different lengths. At the free end 11a the leaf spring packet 11 accordingly comprises only 9 leaf springs and the cover leaf spring 15 whereby the outer leaf spring 16 arranged opposite the cover leaf spring 15 extends over the entire length of the leaf spring packet 11 as does the leaf spring 14. Viewed in the direction of rotation D, the five leaf springs 17 arranged behind this leaf spring 16 in the direction of rotation D have different lengths. The leaf spring 17 which is arranged outwardly at the screw 13 extends to the clamping bracket 12b and at its end is provided with a curved portion 17a. The leaf spring 17 is fastened with this curved portion 17a by a bolt 18 that penetrates the curved portion 17a and the two legs of the clamping bracket 12b which surrounds the leaf spring packet 11 (FIGS. 4 and 6). The neighboring leaf spring 17 extends to the bracket 10b and is connected thereto in the same manner as described above by a bolt 19. Parallel to the bolt 19, a bolt 20 is arranged within the bracket 10b, the bolt 20 being enclosed by a sleeve 21 between the two bracket legs, the sleeve serving to provide a gliding support for the outwardly oriented leaf spring 17 at this location which extends to the neighboring clamping bracket. Each of the other leaf springs 17 extends farther in the radially outward direction by the same amount relative to the previous leaf spring. All of the leaf springs 17 are connected in the aforedescribed manner. Accordingly, a respective leaf spring 17, thus forms the backside of the leaf spring packet for the distance between a clamping bracket and the neighboring bracket.

Since the broaching arm is curved from its stretched position counter to the direction of rotation D (FIG. 1), whereby the radius of curvature depends on the required operational position of the broaching arm, the radius of curvature at the front side and the backside of the leaf spring packet differs with the changing of the degree of bending. The resulting spreading of the leaf springs is prevented by the clamping brackets 12, 12a, and 12b. The clamping bracket 12 is represented in FIGS. 5 and 6. It can be seen that the two bracket legs 22 and 23 are penetrated by a bolt 24 on a side opposite to the location of the bolt 18. The bolt 24 serves to support a leg spring 25 with its spring coil 26. The two spring legs 27 and 28 are bent at a right angle relative to the spring coil 26 and rest on both sides of the clamping bracket 12 at the forward side of the leaf spring packet 11, when viewed in the direction of rotation D (FIG. 4). Correspondingly, the leaf spring packet is clamped between the bolt 18 and the leg spring 25. When bending the broaching arm into its backwardly curved position, the legs 27 and 28 of the leg spring 25 are loaded with increasing curvature whereby the outer leaf spring of the leaf spring packet 11 approaches the spring coil 26. This can be seen in FIG. 4 in connection with FIG. 2. Within the clamping bracket 12b which is adjacent to the rotor 2, the outer leaf spring 14 has a greater distance to the spring coil 26 than the outer leaf spring, here the cover leaf spring 15, within the clamping bracket 12. In order to prevent contact between the outer leaf spring 14, respectively, 15, and the spring coil 26 and in order to prevent wear of the leg spring 25, a plate 29 is connected, for example, by welding, to the bracket legs 22 and 23. The plate 29 limits with its upper edge 30 the movement of the outer leaf spring 14, respectively, 15 in direction toward the spring coil 26 and thus forms an abutment for the outer leaf spring 14, respectively, 15. Due to this abutment, an over extension of the spring legs 27 and 28 is also prevented. The plate 29 at its upper edge is provided with two lateral cutouts 31 and 32. Within the cutouts 31 the portion of the spring leg 28 which is vertical to the bolt 24 is positioned with play so that under load it may move outwardly to a limited extent. The other cutout 32 is provided only to facilitate the manufacture and mounting of the abutment since the plate 29 may thus be designed in a symmetric fashion. It would also be possible to provide an identical abutment plate at the opposite side of the clamping bracket so that thereby additionally a protection of the spring coil against soiling would be achieved. The clamping bracket may furthermore be closed off at its forward side, viewed in the direction of rotation D, in order to protect the spring coil from soiling and wear.

The brackets 10, 10a, 10b and 10c are U-shaped and arranged within the leaf spring packet 11 such that the open side of the U-shaped bracket is behind the leaf spring packet, relative to the direction of rotation D. The leaf spring packet 11 is held between the bolts 19 and 20 of the bracket arranged on one side and the transverse stay of the bracket on the opposite side. On this transverse stay, that is at the forward side of the leaf spring packet, a wear protection is provided in the form of a plate 33 which is welded thereto or connected thereto by rivets 33A and 33B.

At the free end of the leaf spring packet 11, a holder 34 is provided for attaching thereto broaching tools of various embodiments. The holder 34 is connected to a leaf spring 35 which is in a central position of the leaf spring packet. For this purpose, the free end of the leaf spring 35 is provided with an eye 36 (FIG. 7) by bending the free end. The backwardly bent end which forms the eye 36 is connected with a rivet 37 to the section of the leaf spring 35 in front of the eye 36. The eye 36 encloses a fastening bolt 38 which is provided in a very strong embodiment. The bolt 38 is connected to the side plates 39 and 40 of the holder 34. The two side plates 39 and 40 which in the assembled condition of the broaching arm are arranged above one another are connected to one another at their forward face, viewed in the direction of rotation D, by a cross-piece 41 that is welded thereto so that a holder 34 with an essentially U-shaped cross-section results. The cross-piece 41 is provided with four threaded bores 42 into which fastening screws of various broaching tools may be threaded. The congruent side plates 39 and 40, in the view according to FIG. 4, are broader in the direction toward the face of the broaching arm whereby their rearward edge 43 is curved. The forward edges 44 of the side plate are slanted such that they form an acute angle with the neighboring rearward edge 43 and an obtuse angle with the cross-piece 41. At the face, between the side plates a fastening plate 45 is attached for example, welded to the side plates. The fastening plate 45 forms an obtuse angle with the cross-piece 41, respectively, the forward edges 44 and thus also with the free end of the leaf spring packet. The fastening plate 45 is provided with six threaded bores 46 for receiving fastening screws of broaching tools.

In FIG. 7, the holder 34 with the end of the leaf spring packet is represented in an enlarged view corresponding to the view of FIG. 4. The fastening bolt 38, viewed over the entire length of the holder 34, is located essentially at the center of the holder and, relative to the cross-piece 41, approximately within the forward third of and above the cross-piece 41. The leaf spring 35 which is fastened to the bolt 38 is the center leaf spring of the leaf spring packet 11. The two outwardly oriented leaf springs 15 and 16 extend past the eye 36 of the center leaf spring 35 in a direction towards the front face of the holder 34. The other leaf springs are shorter and are spaced at a distance from the eye 36. The forwardly oriented outer leaf spring, respectively, the cover leaf spring 15, rests in a slidable manner at the cross-piece 41 which forms the U-shaped profile of the holder 34 together with the slide plate 39, 40. The other outwardly oriented leaf spring 16 is slidably supported at a connecting bar 47 which connects the side plates 39 and 40 of the holder 34 and which is welded to the inner side walls of the side plates. For supporting the leaf spring packet a transverse bolt 48 is furthermore connected to the two side plates of the holder 34. The transverse bolt 48, between the side plates, is enclosed by a sleeve 49 which also constitutes a gliding support. Due to the forces, which are exerted on the broaching tool and the holder during the broaching operation, the center leaf spring 35 which is connected to the bolt 38 is loaded by pulling and torsion forces. The danger of breakage due to torsion forces is essentially precluded because the center leaf spring 35 is supported at the neighboring leaf springs, whereby the outer leaf springs 14 and 15, respectively, 16 are supported in a slidable manner within the holder S4 and within the brackets 10 to 10c as well as within the clamping brackets 12 to 12c. The bending load resulting from the curvature of the leaf spring packet is kept to a minimum for the leaf spring 35 connected to the bolt 38, because this leaf spring 35 is arranged within the neutral zone of the leaf spring packet 11. The other leaf springs may slide relative to one another when the radius of curvature of the leaf spring packet 11 changes, whereby the outer leaf springs are also displaced within their sliding support.

The side plate 39 of the holder 34 which is adjacent to the bottom portion 4 of the silo 1 is provided with a glide plate 50 connected to the side plate with its upper narrow side (FIGS. 3 and 4). Viewed in the direction of rotation D, the glide plate 50 extends, according to the plan view of FIG. 4, from the forward side of the leaf spring packet 11, rearward past the backside in a slanted manner. The glide plate 50 serves to support the holder 34 at the bottom portion 4 of the silo and thus constitute a weight relief for the leaf spring packet. The glide plate 50 may be provided at its front side with grooves for guiding dirt particles through to the rear during rotation of the broaching arm. An essentially identical, however shorter glide plate 51 is connected to the bottom stay of the bracket 10. It extends rearwardly over the entire width of the leaf spring packet in a slanted manner. At the upper stay of this bracket 10 a coupling element 52 for fastening the cable 9 (FIG. 1) is provided.

FIGS. 3, 4, 8, 9 and 10 show various embodiments of broaching tools whereby the broaching tool 8 of FIG. 8 corresponds to the schematically represented broaching tool of FIG. 1.

In FIGS. 3 and 4, a broaching tool 53 connected to the holder 34 is represented which is comprised of two parallel, congruent flat portions 54 and 55 which are welded to a fastening stay 56. The fastening stay 56 is connected by six socket head cap screws 57, which are threaded into the threaded bores 46 of the fastening plate 45 in a flush manner, to the holder 34 and has thus a corresponding slanted orientation as the fastening plate 45 of the holder 34. The forward edge 58 of each flat portion 54 and 55 extends with a section 58A from the fastening stay 56 vertical to a plane of this stay to the forward edge 44 of the holder 34. The section 58A has an angular transition into a concave section 58B which extends in a straight line to an end 59 of the flat portions 54, respectively, 55. The backward edge 60 has a section 60A adjacent to the fastening stay 56 which is essentially straight and parallel to the section 58A of the forward edge 58. It has a transition at approximately half the height of the concave section 58B of the forward edge 58 into an approximately circular arc-shaped section 60B which extends to form the end 59 of the flat portion. The broaching tool 53 is thus embodied as a double hook which extends essentially vertical to the forward edge 44 of the holder 34 and at an obtuse angle relative to the longitudinal axis of the free end 11a of the leaf spring packet 11. The front portion of the broaching tool with the end 59 and the neighboring sections is arranged before the plane of the free end of the forward leaf spring 15, relative to the direction of rotation D. This construction results in the backwardly bent working position of the broaching arm 3 at the broaching tool 53 being essentially located within the pulling axis of the broaching arm 3 so that the torsion load of the leaf spring is accordingly very small. This broaching tool is especially suitable for the use in silos which contain a stored material with a high degree of moisture so that contamination of the stored material due to corrosion may occur. For this particular application, the broaching tool is made of stainless steel.

The broaching tool 8 according to FIG. 8 is embodied as a circular arc-shaped hook which is also provided with a forwardly oriented end. This broaching tool has a connecting plate 61 welded thereto which is designed to be screwed onto the cross-piece 41 of the holder 34. The connecting plate 61 accordingly is provided with four bores 62 for receiving in a flush manner socket head cap screws which are to be threaded into the threaded bores 42 of the cross-piece 41. The broaching tool 8 is especially suitable for silos in which wood chips are being stored.

FIG. 9 shows a broaching tool 63 that has welded thereto a connecting plate 64 with four bores 65 and which is embodied as a short, sickle-shaped hook. This broaching tool is especially suitable for loosening chopped materials.

The broaching tool 66 according to FIG. 10 is horn-shaped and extends approximately vertically relative to its connecting plate 67 which is also provided with four bores 68 for connecting it to the cross-piece 41. This broaching tool may be embodied with a single flat portion or with two flat portions in the form of a double horn and essentially functions as a scraper for loosening stored material.

The important advantage of the inventive broaching arm lies in its improved wear and breakage resistance to which the protected position of the leaf spring 35 connected to the holder 34 within the center of the leaf spring packet contributes substantially. The embodiment of the clamping bracket 12 with the abutments 29, the arrangement of the wear-resistant cover leaf springs 15, and the glide plates 50 and 51 which support the broaching arm also contribute substantially to the improved wear and breakage resistance of the broaching arm.

The present invention is, of course, in no way restricted to the specific disclosure of the specification and drawings, but also encompasses any modifications within the scope of the appended claims.

What I claim is:

1. A broaching device for a silo, comprising:
   a rotor,
   at least one broaching arm connected to said rotor, said broaching arm comprised of leaf springs stacked on top one another to form a leaf spring packet, and further comprising brackets for holding said leaf springs together, said broaching arm extending to a wall of the silo and being curved opposite to a direction of rotation of said rotor;
   a holder fixedly connected to one of said leaf springs arranged in a center position of said leaf spring packet at a free end of said leaf spring packet, with outwardly positioned ones of said leaf springs of said leaf spring packet being slidably supported at said holder; and
   a broaching tool attached to said holder.

2. A broaching device for a silo according to claim 1, wherein said leaf spring arranged in said center position is connected to said holder at a portion of said holder, said portion being substantially centrally located relative to a longitudinal extension of said holder in a longitudinal direction of said leaf spring packet.

3. A broaching device according to claim 1, wherein said holder has a U-shape and comprises a cross-piece and two side plates connected to one another by said cross-piece to form said U-shape, and further comprising a connecting bar for connecting free ends of said side plates to one another, with a first one of said outwardly positioned leaf springs that is forwardly oriented with respect to said direction of rotation being slidably supported at said cross-piece and with a second one of said outwardly oriented leaf springs that is rearwardly oriented with respect to said direction of rotation being slidably supported at said connecting bar.

4. A broaching device according to claim 1, wherein at least some of said brackets are clamping brackets, each said clamping bracket comprising a leg spring having a spring coil and legs, said clamping brackets being supported with said leg springs at a first one of said outwardly positioned leaf springs that is forwardly oriented with respect to said direction of rotation such that said spring coils extends transverse to a longitudinal direction of said leaf spring packet and said legs rest at said first outwardly positioned leaf spring, said clamping bracket further comprising an abutment for limiting a movement of said spring coil toward said leaf spring packet.

5. A broaching device according to claim 4, wherein said abutment is a plate with at least one cutout, with one of said legs of said leg spring resting in said cutout with play, said plate having a face facing said leaf spring packet, said face being closer to said first outwardly positioned leaf spring than said spring coil.

6. A broaching device according to claim 1, wherein a first one of said outwardly positioned leaf springs that is forwardly oriented with respect to said direction of rotation is further comprised of an outwardly oriented cover leaf spring in the area of said free end of said leaf spring packet.

7. A broaching device according to claim 6, wherein said cover leaf spring extends approximately over 50% of a length of said leaf spring packet.

8. A broaching device according to claim 1, wherein said broaching tool is embodied in various shapes selected from the group consisting of a double hook, a circular arc-shaped hook, a sickle-shaped hook, and a horn-shaped hook and is exchangeably attached to said holder.

9. A broaching tool according to claim 8, wherein said holder comprises a fastening plate connected to said free end of said leaf spring packet for attaching thereto said broaching tool, said fastening plate being arranged at an angle relative to a longitudinal direction of said free end of said leaf spring packet.

10. A broaching device according to claim 9, wherein said angle is an obtuse angle, with said fastening plate extending rearwardly relative said direction of rotation.

11. A broaching device according to claim 9, wherein said broaching tool extends essentially perpendicular to a plane that extends at an obtuse angle and counter to said direction of rotation relative to a plane of said leaf spring arranged in said center position, said broaching tool having a hook-shaped end that is pointing in a forward direction relative to said direction of rotation.

12. A broaching device according to claim 10, wherein said broaching tool comprises two parallel congruent flat portions that are hook-shaped.

13. A broaching device according to claim 1, wherein said holder comprises a cross-piece connected to a longitudinal side of said leaf spring packet for attaching thereto said broaching tool, said cross-piece being parallel to a wide side of said free end of said leaf spring packet.

14. A broaching device according to claim 13, wherein said broaching tool connected to said cross-piece is selected from the group consisting of a hook that is essentially curved as a circular arc over most of its length, a short, sickle-shaped hook, and a horn-shaped scraper that is essentially perpendicularly arranged relative to said cross-piece.

15. A broaching device according to claim 1, further comprising a glide plate connected to said holder for supporting said broaching arm at a bottom portion of the silo.

16. A broaching device according to claim 1, further comprising a glide plate connected to one of said brackets which is adjacent to said holder for supporting said broaching arm at a bottom portion of the silo.

17. A broaching device according to claim 1, further comprising glide plates, connected to said holder and one of said brackets which is adjacent to said holder, for supporting said broaching arm at a bottom portion of the silo.

* * * * *